J. M. LEAVER, Jr.
GAGE.
APPLICATION FILED JAN. 15, 1908.
957,779.
Patented May 10, 1910.
6 SHEETS—SHEET 1.
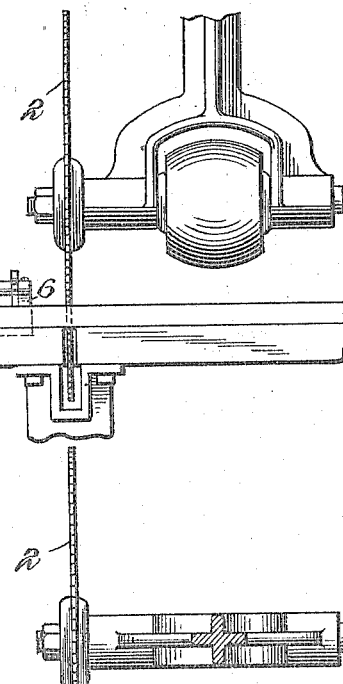
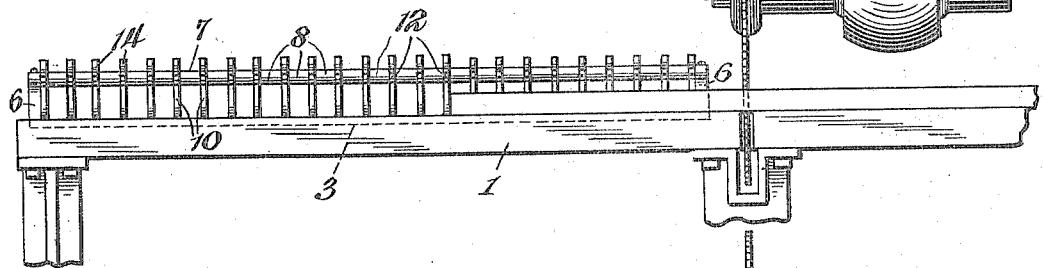
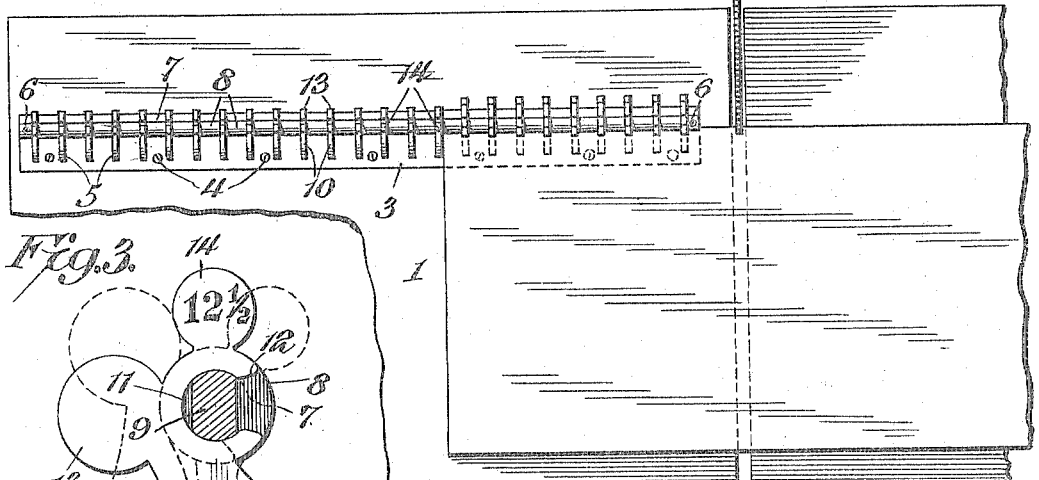
James M. Leaver, Jr.,
Inventor,
Witnesses
Howard D. Orr.
By E. G. Siggers
Attorney

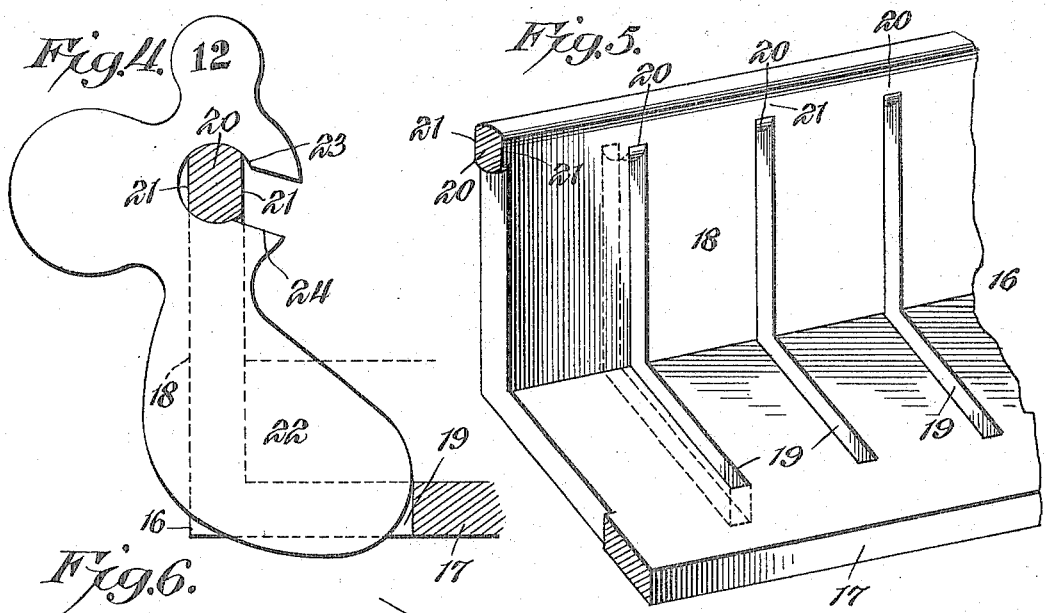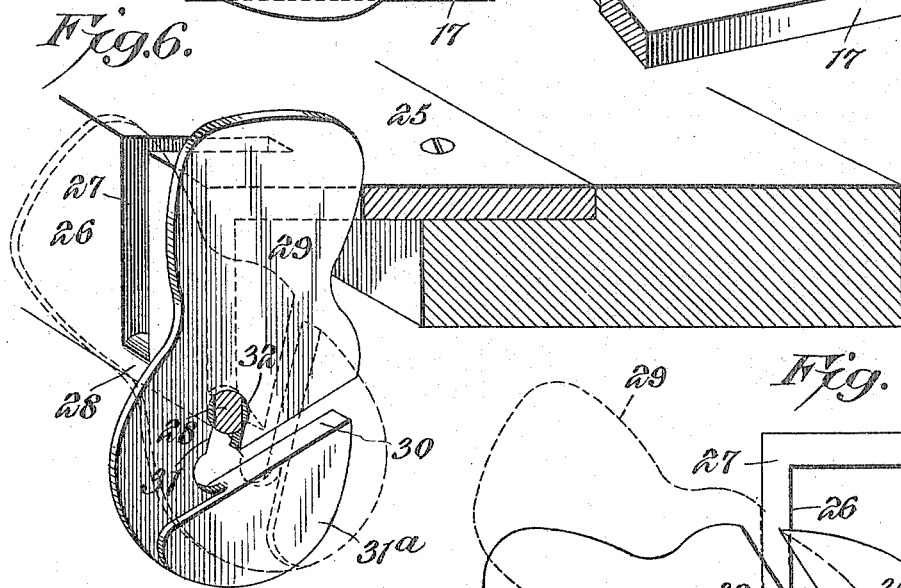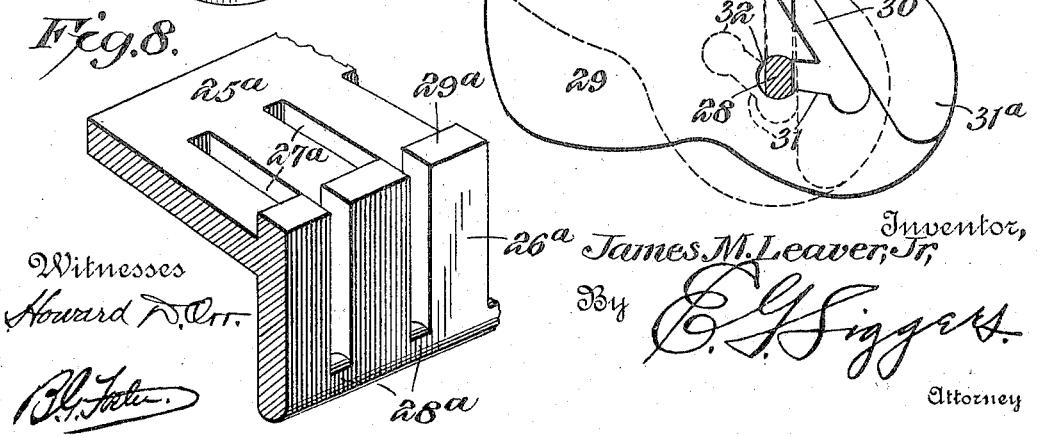

J. M. LEAVER, Jr.
GAGE.
APPLICATION FILED JAN. 15, 1908.
957,779.
Patented May 10, 1910.
6 SHEETS—SHEET 3.
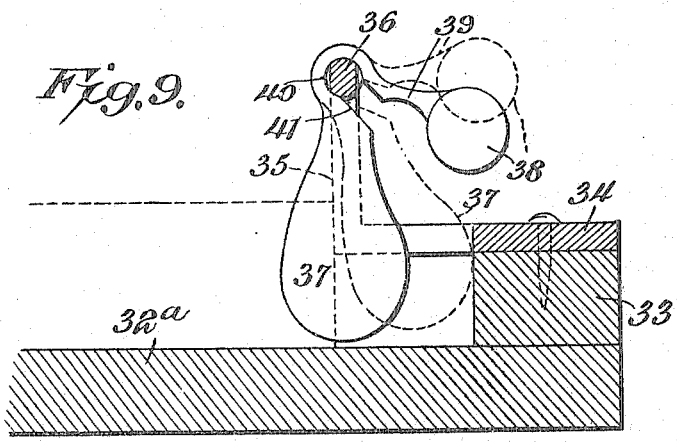
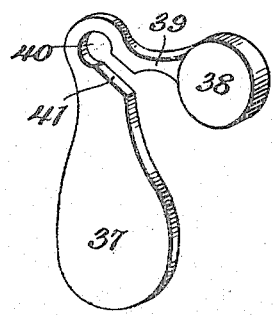
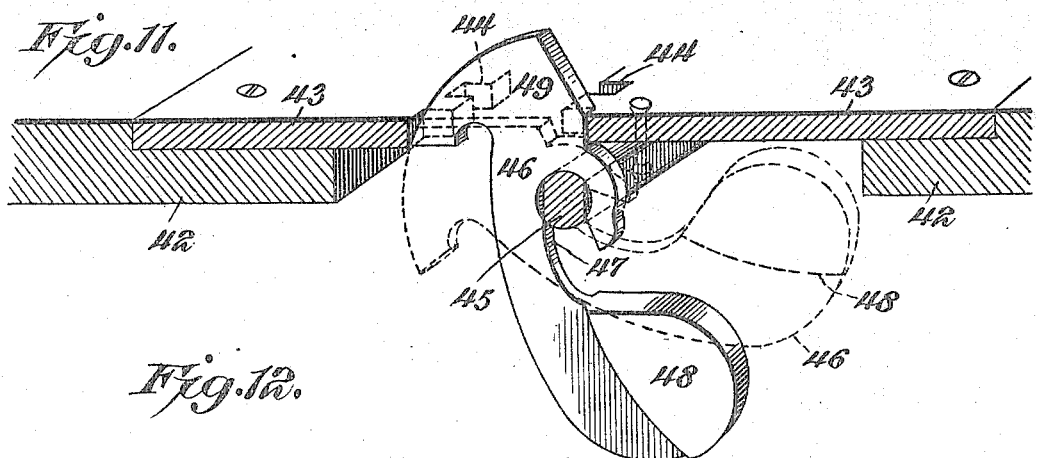
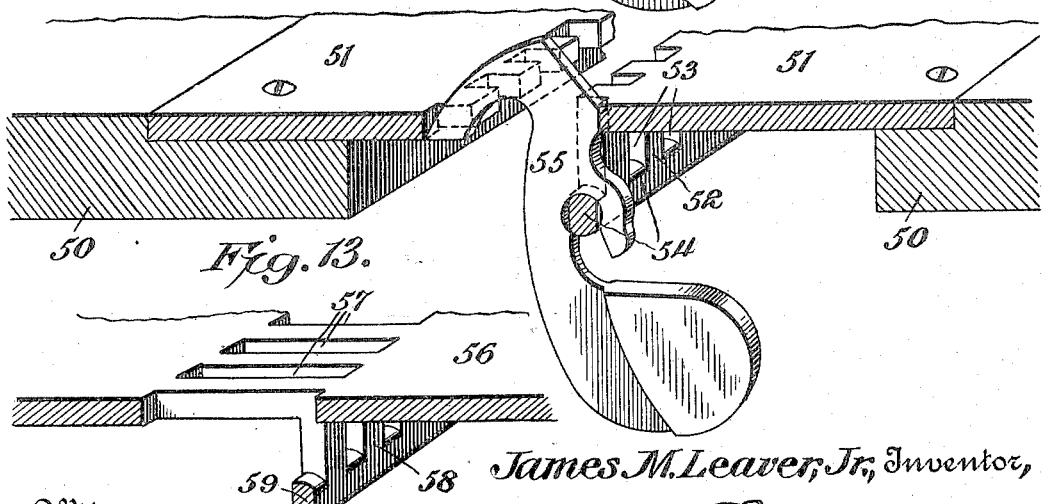
James M. Leaver, Jr., Inventor,
Witnesses
Howard N. Orr.
B. G. Tate.
By E. G. Siggers
Attorney J. M. LEAVER, Jr.
GAGE.
APPLICATION FILED JAN. 15, 1908.
957,779.
Patented May 10, 1910.
6 SHEETS—SHEET 4.
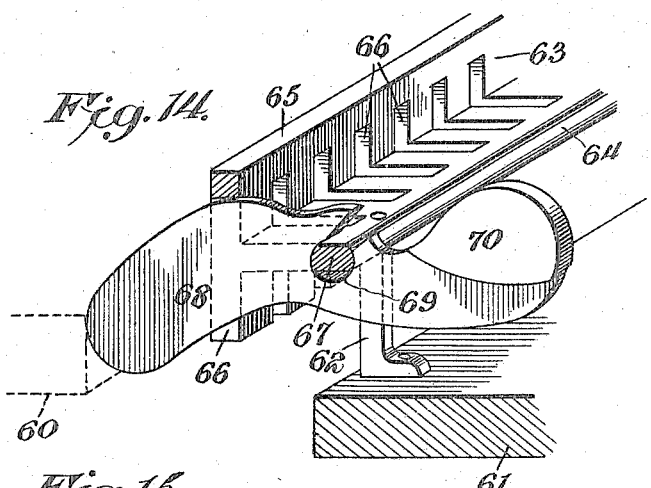
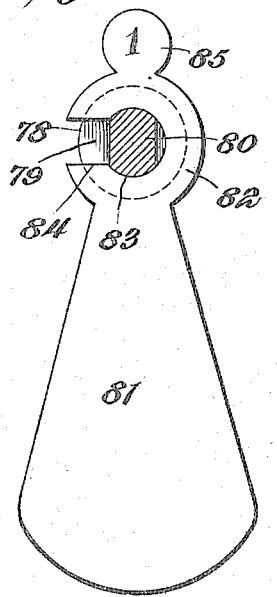
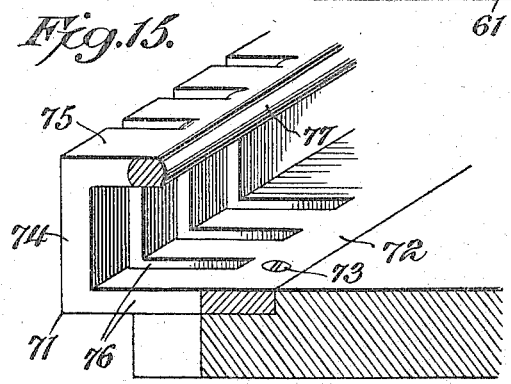
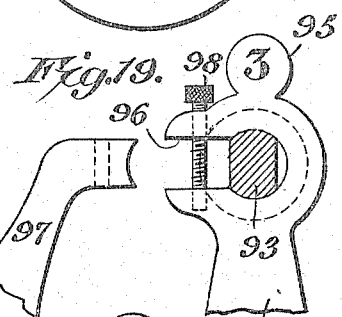
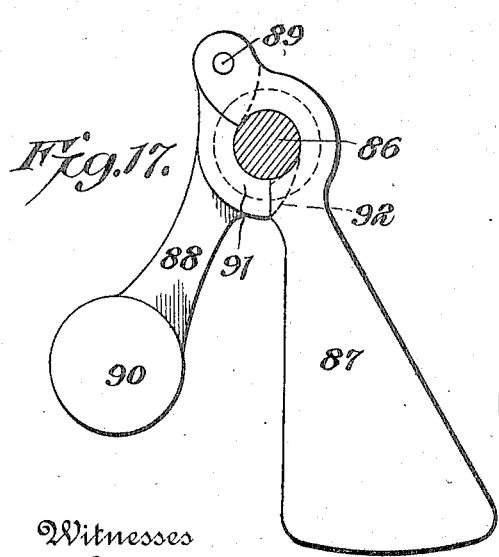
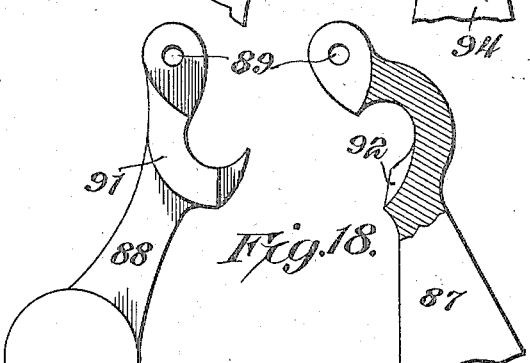
Witnesses
Howard F. Orr.
James M. Leaver, Jr., Inventor,
By E. G. Siggers
Attorney

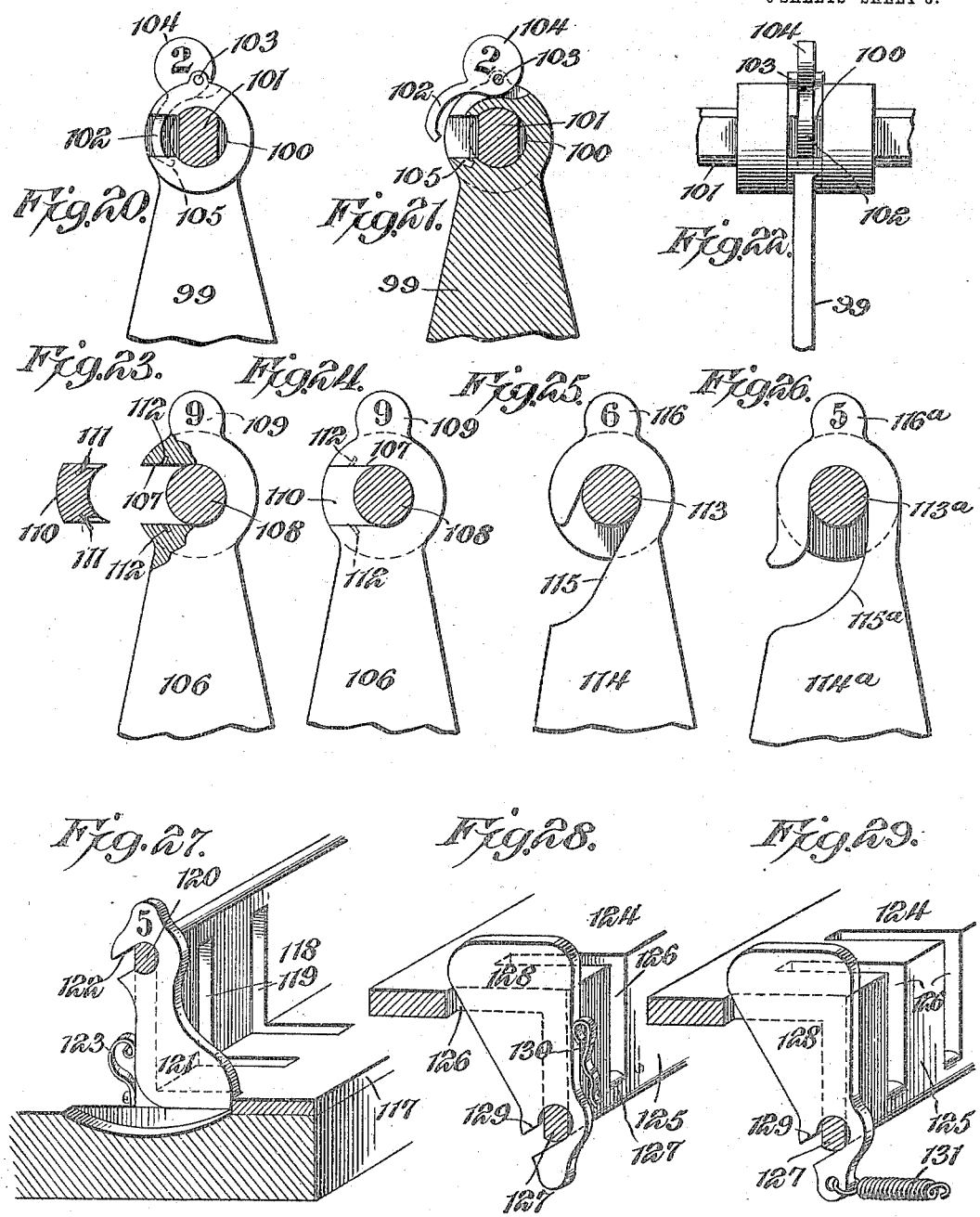

J. M. LEAVER, Jr.
GAGE.
APPLICATION FILED JAN. 15, 1908.

957,779.

Patented May 10, 1910.
6 SHEETS—SHEET 6.

Witnesses
Howard D. Orr.

James M. Leaver, Jr., Inventor,
By
Attorney

UNITED STATES PATENT OFFICE.

JAMES MARSHALL LEAVER, JR., OF SONORA, CALIFORNIA.

GAGE.

957,779.      Specification of Letters Patent.      Patented May 10, 1910.

Application filed January 15, 1908. Serial No. 410,980.

*To all whom it may concern:*

Be it known that I, JAMES M. LEAVER, Jr., a citizen of the United States, residing at Sonora, in the county of Tuolumne and State of California, have invented a new and useful Gage, of which the following is a specification.

The present invention relates more particularly to means for gaging the size of lumber to be sawed or cut, but is not necessarily limited thereto, as it is capable of being advantageously used in metal stamping, punching, shearing machines, and the like.

The principal object of the present invention is to provide a gage in which the stops can be readily moved from one place to another to provide for changes in the cutting sizes, and also to permit the ready interchange of different stops for unusual lengths without the necessity of removing or adjusting all of the gage stops.

A further object is to provide mechanism which, while permitting the ready removal and replacement of any stop independent of the others, will effectively hold the stops against accidental detachment while in their working positions.

A number of embodiments of the invention are illustrated in the accompanying drawings, and it is to be understood particularly by reference to the appended claims that the invention is not necessarily limited to the forms shown, but will cover other changes and modifications not specifically disclosed.

Figure 30:
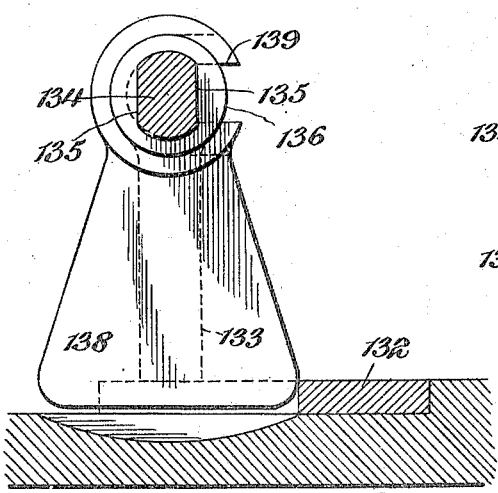
Figure 31:
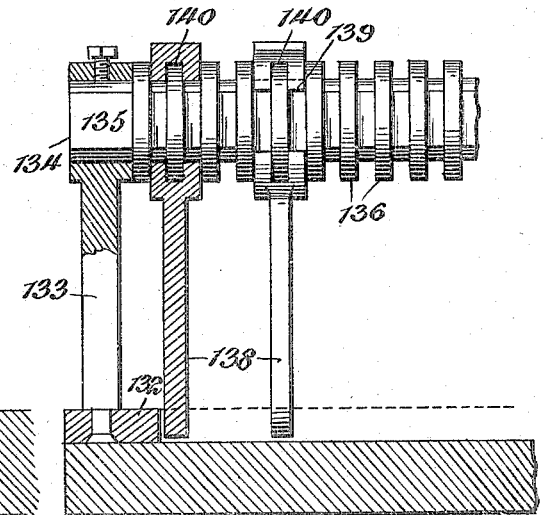
Figure 32:
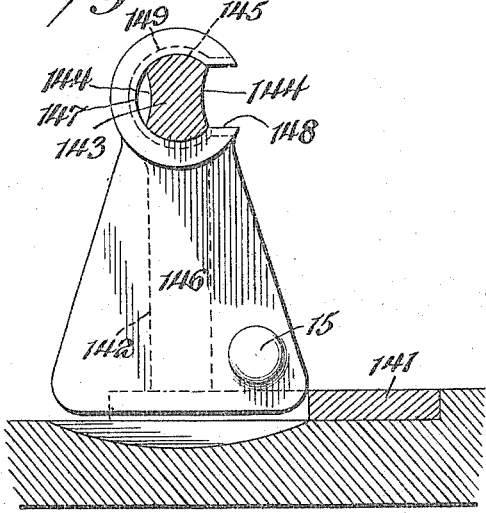
Figure 33:
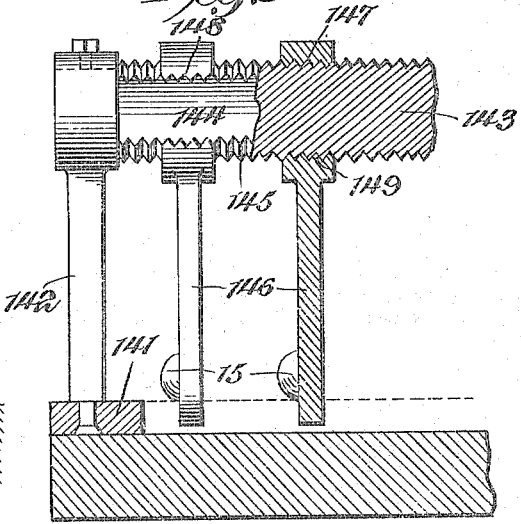
Figure 34:
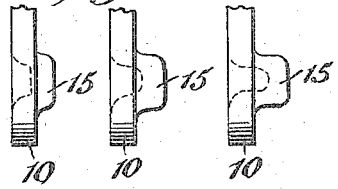
Figure 35:
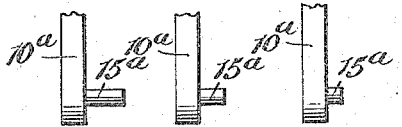

In the drawings:—Figure 1 is an elevation of a saw table and saw showing one form of the gage thereon. Fig. 2 is a top plan view of the same. Fig. 3 is a cross sectional view on an enlarged scale through said gage. Fig. 4 is a cross sectional view through another embodiment of the invention. Fig. 5 is a perspective view of the support for the stops illustrated in Fig. 4. Fig. 6 is a sectional perspective view of another form of construction. Fig. 7 is a sectional view of the form illustrated in Fig. 6. but showing the position of the parts when in inoperative position and indicating the manner in which a stop can be detached. Fig. 8 is a modification of the support shown in Figs. 6 and 7. Fig. 9 is a sectional view through a still different form of construction. Fig. 10 is a perspective view of one of the stops employed in the structure shown in Fig. 9. Fig. 11 is a detail perspective view of another modified form of construction. Fig. 12 illustrates the modification of the structure shown in Fig. 11. Fig. 13 is a slightly different form of support for the stop shown in Figs. 11 and 12. Fig. 14 illustrates another modification of the invention. Fig. 15 is a modification of the supporting structure shown in Fig. 14. Fig. 16 is still another modification of the invention. Fig. 17 is a modification of the structure shown in Fig. 16. Fig. 18 is a detail view partly in section of the stop shown in Fig. 17. Fig. 19 is still a different form of construction. Fig. 20 is a sectional view through a gage that is comprehended by the present invention. Fig. 21 is a sectional view through the stop thereof. Fig. 22 is a side elevation of the structure shown in Figs. 20 and 21. Figs. 23 and 24 illustrate a structure along the lines shown in Fig. 20, but having a different form of retaining device, this retaining device being respectively illustrated in operative and in inoperative positions. Figs. 25 and 26 are sectional views through other modifications. Fig. 27 is a detail perspective view of another modification of the invention, in which a return spring takes the place of a weight. Fig. 28 is a modification of the structure illustrated in Fig. 27. Fig. 29 is still another modification of the same. Fig. 30 is a cross sectional view through a still different embodiment of the invention. Fig. 31 is a longitudinal sectional view through a portion of the structure illustrated in Fig. 30. Figs. 32 and 33 are respectively a cross and a longitudinal sectional view through a modification of the form illustrated in Figs. 30 and 31. Fig. 34 is a rear view of the lower portions of certain of the stops showing the stop projections thereon. Fig. 35 is a similar view, showing modified forms of stops.

Similar reference numerals designate corresponding parts in all the figures of the drawings.

The sawing machine may be of any well known or desired character, and in Figs. 1 and 2, a table 1 is provided, with which a circular saw 2 coöperates. On this table is mounted the gage. The gage in the embodiment disclosed in Figs. 1–3 inclusive consists of a base plate 3 secured by suitable fasteners 4 to the table, and has a plurality of transversely disposed slots 5 thereon. Standards 6, mounted on the ends of the base plate, have a pivot rod 7 secured thereto. This pivot rod consists of alternate circular portions 8 and portions 9 provided with opposite flattened sides. The latter are located directly over the slots 5. Swinging single piece gage stops 10 are mounted on the pivot, and consist of flat plates, the lower ends of which operate in the slots 5, the upper ends having slots that receive the flattened portions 9 of the pivot. These slots are provided with enlarged inner bearing portions 11 in which the flattened portions 9 of the pivot are located, and contracted outer portions or mouths 12 which are sufficiently wide to permit the portions 9 to pass therethrough when the flattened sides register therewith, but are too narrow to allow the portions 9 to pass therethrough when in the position illustrated in Fig. 3. The stops are provided with rearwardly extending portions 13 which constitute weights for normally holding the lower ends in the slots 5, and said stops furthermore are provided with upstanding tabs 14, which may be provided with numerals indicating the distance said stops are located from the saw. Certain of these stops are provided at their lower portions with outstanding projections 15. These projections are of different lengths and may be made by stamping the metal, as shown in Fig. 34, or stops, as 10$^a$ may be provided with outstanding pins 15$^a$ of different lengths, as illustrated in Fig. 35. With this construction, it will be evident that while the stops will readily swing out of the way, in order to permit a piece of timber being cut at any length desired, any stop may be detached from the support without detaching or in any manner deranging the others. This is a highly desirable feature for many reasons. For instance, if the stops are located an inch apart, any cut in inches may be readily gaged, but if it is desired to cut fractional sizes between the stops, one of the stops is supplanted by a stop having a projection 10 or 10$^a$ thereon, these projections being of different lengths, say eighths, quarters and halves. The gage may thus be readily arranged for fractional lengths.

In Figs. 4 and 5, a slightly different form of construction is illustrated. In this embodiment, the base 16 comprises an angle bar having a horizontal flange 17, which is fastened to the table, and an upstanding flange 18. These flanges are provided with slots 19, and said slots terminate short of the upper edge of the upright flange, thus forming in effect a pivot 20, which, as shown in Fig. 4, has opposite flat sides 21. The gage stops, one of which is shown and designated 22, operate in the slots 19, and have slots provided with enlarged inner portions 23 that receive the pivot and contracted outer portions or mouths 24, which while normally locking the stops in place, will permit the detachment thereof when the mouths or narrow portions are alined with the flattened sides 23 of the pivot. It will be observed that this structure has all the advantages of that already described, and is even more simple as the base can be produced from a single piece of metal.

In Figs. 6 and 7, another embodiment of the invention is disclosed. The base 25 consists of an angle bar but the upright flange 26 thereof is disposed in depending relation. Slots 27 are formed in the base, producing a pivot 28 with opposite flattened sides. The gage stop 29 operates in any of the slots and projects upwardly above the base of the table. It is provided in its lower portion with a downwardly inclined slot 30 having an upwardly extending inner end portion 31 provided with an enlargement 32 in which the pivot is engaged. This stop can be forced rearwardly out of the way by a piece of timber placed upon the table, but will swing back into place, inasmuch as the lower end is weighted, as shown at 31$^a$. It will not accidentally become detached, but may be removed, as indicated in dotted lines in Fig. 7. The form of base or support is capable of modification. For instance in Fig. 8, said base, designated 25$^a$ has the usual depending flange 26$^a$, and is provided with slots 27$^a$, forming a pivot 28$^a$. The flange, however, extends upwardly, as shown at 29$^a$ above the upper face of the table, forming a stop against which the timber may be abutted.

Referring now to Figs. 9 and 10, still another embodiment of the invention is disclosed. In this case, the table, which is designated 32$^a$, has a bar 33 secured thereon, and mounted on this bar is the base 34 comprising an angle bar having an upstanding flange 35, said base and flange being slotted, and the slots terminating short of the upper edge of the flange, forming a pivot 36. The stops 37 are hung from the pivot and operate in the slots, being capable of rearward swinging movement toward the bar 33. They are normally held in projecting relation with respect to the flange 35, by a rearwardly extending weight 38 carried by an arm 39 which forms a part of the upper end of the gage stop. Between this arm and the body of the stop is formed a slot having an enlarged inner portion 40 in which the pivot 36 is normally engaged and an outer contracted portion or mouth 41 through which said pivot can pass.

In Fig. 11, another form of construction is illustrated. The table comprises sections 42 spaced apart, and secured to the adjacent ends of said sections are plates 43 provided with notches or slots 44. A pivot bar 45, located below one of the plates 43, has opposite flattened portions, and the gage stops, one of which is shown at 46, are provided with a slot 47 that receives the pivot. Each gage stop has a lower depending weighted end 48 and an upstanding portion 49 that is movable in the notches or slots 44 and projects above the table top, as indicated in dotted lines. The stop is capable of being pressed downwardly so that it is out of the way, but will return to projecting relation when the superposed article is removed.

A modification of the structure shown in Fig. 11 will be found in Fig. 12. The table sections 50 carry the notch or slotted plates 51, and one of these plates is provided with an integral depending flange 52 slotted, as shown at 53, and forming a pivot 54. Gage stops 55, corresponding in all respects to the gage stops 46, above described, are mounted on the pivot 54 and operate between the plates 51 and the slots thereof. The base or support of both of the structures illustrated in Figs. 11 and 12 may be modified, as illustrated in Fig. 13, in which case, a single horizontal plate 56 is employed which is slotted, as shown at 57, and is provided with a depending flange 58, the slots extending downwardly into said flange and terminating short of the lower end thereof to produce the pivot 59.

Referring now to Fig. 14, still another form of construction will be found. In this embodiment, the table is indicated in dotted lines at 60, and in rear of the same, is a support 61. Standards 62, carried by the support, have fastened to their outer ends, an angle bar 63. This angle bar is substantially T-shaped in cross section, a horizontal flange 64 thereof being secured to the standards, and an upright flange 65, extending below and above the horizontal flange. These flanges are slotted, as shown at 66, forming a pivot 67 at the end of the horizontal flange. Gage stops, one of which is illustrated at 68 have between their ends slots 69 and these slots have enlarged inner ends that receive the pivot, the outer contracted mouths normally preventing the detachment of the gage stops from the same. The rear ends of the gage stops are weighted, as shown at 70, while the front ends operate in and project from the upright flange 65. It will be evident that said front ends can be forced downwardly out of the way, but will be returned by the weighted rear ends 70. Instead of the support illustrated in Fig. 14, that shown in Fig. 15 may be employed. In this case, said support consists of a substantially L-shaped bar 71 having a horizontal lower flange 72 secured by screws 73 or other devices, an upright flange 74 and an upper horizontal flange 75. These various flanges are slotted as illustrated at 76, and the slots terminate short of the free edge of the upper flange, forming a pivot 77.

Another embodiment of the invention is illustrated in Fig. 16. In this case, the pivot 78 is provided with alternate circular portions 79 and flattened portions 80. The gage stop 81 depends from the pivot, and has an ear 82 provided with a slot. This slot has an inner enlarged portion 83 and an outer contracted mouth 84. The slot receives the flattened portion 80 of the pivot, and consequently permits the necessary swinging movement of the gage stop, while said gage stop can be detached if swung to a horizontal position, as will be evident. These stops carry upstanding tabs 85 on which indicating numerals are placed.

In Figs. 17 and 18, the pivot 86 is circular in cross section, and the gage stop consists of sections 87 and 88. The section 87 is the stop proper, and the section 88 is pivoted thereto, as shown at 89, and is provided at its lower end with a weight 90. These two sections are provided with interfitting hooks 91 and 92, which embrace the pivot. Thus when in place, thereon, the hooks will be held in interfitting relation. By swinging the sections apart, the gage stop can be removed. A structure somewhat similar to the above, but different in detail is shown in Fig. 19. In this case, the pivot 93 has portions provided with flattened sides. The stop 94 has a slot that receives the same, but also has an upstanding indicating tab 95. The contracted outer end 96 of the slot is arranged to be closed by the upper end of a detachable section 97, which fits in said contracted end, and is secured therein by a screw 98, which passes through the section 97. In this embodiment of the invention, it is necessary to detach the section 97 before the stop can be removed from the pivot.

Figs. 20, 21 and 22 illustrate still another modification of this invention. The gage stop, designated 99 is provided with a transverse slot 100 in its upper portion, said slot having an enlarged inner end and a contracted outer mouth, the inner portion receiving the pivot 101. The mouth is normally closed by a keeper 102 pivoted to the upper end of the gage stop, as shown at 103, and having an upstanding weighted portion 104, which holds the keeper in operative position across the mouth, and may be employed as a tab on which the indicating numeral is placed. The lower end of the keeper detachably engages in a socket 105, formed in the bottom of the slot.

In Figs. 23 and 24, the gage stop 106 is provided in its upper portion with a transverse slot 107 and the pivot 108 in this case, is circular in cross section. The upper end of the gage stop has an integral tab 109 and the mouth or open end of the slot is closed by a retaining device or keeper 110, which detachably fits therein and has spring tongues 111 detachably engaging in sockets 112, formed in the opposite sides of the mouth.

No specific claims are made in this application to the structures disclosed in Figs. 17–24 inclusive, inasmuch as the same constitute the specific subject-matter of another application filed simultaneously herewith, Serial No. 410,983.

In Figs. 25 and 26, the pivot rods respectively designated 113 and 113ª are also circular in cross section, and the gage stops 114 and 114ª are provided with upwardly extending slots 115 115ª, in which the pivots are engaged. The slots 115 in the gage stop 114ª is disposed at an inclination, while that illustrated in Fig. 26 has an inwardly extending lower portion and a vertically disposed inner end. These gage stops furthermore have upstanding integral tabs, designated 116 and 116ª.

Referring to Fig. 27, the base, as in some of the previously described constructions, consists of an angle bar 117 having a vertical flange 118 with slots 119, the slots terminating short of the upper edge of the vertical flange forming a pivot 120. Gage stops 121 are pivotally mounted on the pivot 120, being provided with slots 122 in which said pivot is engaged, the lower end of the gage stops swinging in the slots 119 and in this instance being held therein by suitable leaf springs 123.

In Fig. 28, the structure is substantially reversed, that is to say, the base, designated 124, has a depending flange 125, and slots 126 terminating short of the lower edge of the flange, forming a pivot 127. The gage stops, one of which is shown and designated 128, project above the base, and have their lower ends journaled on the pivot, said lower ends being provided with upwardly inclined slots 129 having enlarged inner ends. Leaf springs 130 serve to hold the stops in the horizontal portions of the slots, but permit the same to be forced rearwardly if a piece of timber is placed against them. Fig. 29 shows substantially the same structure, with the exception that a coiled spring 131 takes the place of the leaf spring, the other parts being the same, and the same reference numerals being applied.

In Figs. 30 and 31, the base consists of a plate 132 having upstanding standards 133, on which is mounted a pivot rod 134. This pivot rod has flat sides 135 and is provided with annular flanges 136. Gage stops 138, swingingly suspended from the pivot, have their lower ends operating in the slots. These gage stops furthermore have transversely disposed slots 139 to receive the pivot, the inner portions of the slot being enlarged and the walls of said slots are provided with recesses 140 that receive the annular flanges 136, and thus, as shown, in Fig. 31, the gage stops are held against movement longitudinally of the pivot rod, but may be readily removed and placed in different positions thereon. With this construction there is no necessity of slotting the base. A modification of this form of construction will be found in Figs. 32 and 33, wherein the base, designated 141, has standards 142 supporting a pivot rod 143 that has opposite flat sides 144. The rod has its rounded portion threaded, as illustrated at 145. Gage stops 146 are provided in their upper ends with transverse slots having enlarged inner portions 147 and contracted mouths 148. They are moreover provided with internal threads 149 coöperating with the threads 145 of the pivot rod. The threads serve to prevent the longitudinal movement of the gage stops on the pivot bar, but it will be evident that said gage stops can be removed and then placed in different positions.

From the foregoing, it is thought that the construction, operation and many advantages of the herein described invention will be apparent to those skilled in the art without further description, and it will be understood that various changes in the size, shape, proportion, and minor details of construction, may be resorted to without departing from the spirit or sacrificing any of the advantages of the invention. In this connection, it may be stated that the present application is considered the parent application, in which all the broad claims are placed that cover the structures shown in my co-pending applications, Serial Nos. 410,981, 410,982, and 410,983.

Having thus fully described my invention, what I claim as new, and desire to secure by Letters Patent, is:—

1. The combination with a support, of a plurality of gage stops pivotally mounted on the support and automatically presented in projecting relation to the work, means for holding the gage stops against movement along the support so as to hold them in spaced relation, the pivotal connection of the stops to the support being constructed to permit the removal of any one of the stops without disturbing the others or removing the support or dismembering the detached stop.

2. The combination of an angular support, a plurality of gage stops pivotally hung from the outer edge of one of the sides of the angular support and automatically presented in projecting relation to the work, the pivotal connection of the stops to the support being constructed to permit the removal of any one of the stops without disturbing the others or removing the support.

3. The combination with a support, of a plurality of gage stops, means for pivotally mounting the stops upon the support so as to cause them to be automatically presented in projecting relation to the work, the pivotal connection of the stops to the support being constructed to permit the removal or displacement of any one of the stops without disturbing the others or the support or dismembering the detached stop.

4. The combination of an angle bar provided with spaced slots, a plurality of gage stops pivotally hung from the outer edge of one of the sides of the angle bar and fitted in the said slots and held against lateral movement and automatically presented in projecting relation to the work, the pivotal connection of the stops to the support being constructed to permit the removal of any one of the stops without disturbing the others or removing the support.

5. The combination of a support provided with a pivot having its cross section presenting two unequal diameters, a plurality of gage stops having a bearing opening of a size to receive the greatest diameter of the pivot, and a mouth leading from the said opening to the outside, said mouth being of a width less than the greatest diameter of the pivot to permit the removal of a gage stop laterally of the pivot without dismembering such gage stop or disturbing the other stops or the support.

6. In a gage of the character set forth, the combination with a support, of a plurality of independently movable gage stops automatically presented in projecting relation to the work and mounted on the support and having slots in which the same is engaged, said slots opening outward at one side of the stop and permitting the detachment of any stop bodily from its engagement with the support independently of the others without dismembering the detached stop.

7. In a gage of the character set forth, the combination with a support including a base having a pivot at one side of the same, of a plurality of independently movable single piece gage stops supported on the pivot for oscillatory movement and automatically presented in projecting relation to the work and having slots that receive the pivot and permit any stop being bodily detached from the support independently of the others and without dismembering the detached stop.

8. In a gage of the character set forth, the combination with a support including a base having slots, and an integral pivot located at one side of the base, of a plurality of independently swinging gage stops supported on the pivot and having their free portions operating in the slots of the base and automatically presented in projecting relation to the work, said gage stops being provided with slots that receive the pivot and permit any stop being detached independently of the others without dismembering the detached stop.

9. In a gage of the character set forth, the combination with a base comprising a bar provided with slots terminating short of the outer edge of the bar and forming a pivot, and gage stops operating in the slots and journaled on said pivot.

10. In a gage of the character set forth, the combination with a base comprising an angle bar, one of the flanges of which is slotted, said slots terminating short of the outer edge of the flange forming a pivot, and gage stops operating in the slots and being journaled on said pivot.

11. In a gage of the character set forth, the combination with a base comprising an angle bar, one of the flanges of which are slotted, said slots terminating short of the outer edge of one of the flanges forming a pivot, and gage stops operating in the slots and journaled on the pivot, being provided with slots that detachably receive the pivot and permit the detachment of any stop independently of the others without dismembering the detached stop.

12. In a gage of the character set forth, the combination with a supporting bar having its cross sectional distance greater in one direction than the other, of a plurality of gage stops formed with slots provided with narrow outer portions and inner enlarged portions, the pivot being normally located in the enlarged portions of the slots, the narrow portions thereof preventing the disengagement of the pivot except when the narrow portion of the latter registers with said slots.

13. In a gage of the character set forth, the combination with a supporting bar provided with a pivot having a flattened portion, of gage stops detachably mounted thereon and having open-ended slots provided with inner enlarged portions that receive the pivot and permit the swinging of the stops, and narrow outer portions that prevent the passage of the pivot therethrough, except when the flattened portion alines therewith.

14. In a gage of the character set forth, the combination with a base comprising an angle bar, one of the flanges of which is slotted, said slots terminating short of the outer edge of the flange forming a pivot having a flattened portion, of gage stops detachably mounted thereon and having open-ended slots provided with inner enlarged portions that receive the pivot and permit the swinging of the stops, and narrow outer portions that prevent the passage of the pivot therethrough, except when the flattened portion alines therewith.

15. In a gage of the character set forth, the combination of a support comprising a base having a plurality of slots and an integral pivot, of a gage stop provided with means for permitting it to be detachably mounted on and removed from the pivot at different points in order to move in the different slots of the support, said stops being swung from the pivot and movable independently thereof so as to be automatically presented in projecting relation to the work.

16. In a gage of the class described, the combination with a support comprising a base having a plurality of slots and a pivot, of a single-piece gage stop arranged to be movably placed in any one of the different slots and having a slot that detachably receives the pivot, said stop being swung from the pivot and movable independently thereof so as to be automatically presented in projecting relation to the work.

17. In a gage of the character set forth, the combination of a support provided with a pivot having its cross section presenting two unequal diameters, a plurality of gage stops having a bearing opening of a size to receive the greatest diameter of the pivot and thereby supported on the latter for oscillatory movement and automatically presented in projecting relation to the work, and a mouth leading from the said opening to the outside, said mouth being of a width less than the greatest diameter of the pivot to permit the removal of a gage stop laterally of the pivot.

18. In a gage of the character set forth, the combination of a support provided with a pivot, a plurality of gage stops having a bearing opening of a size to receive the pivot and thereby supported on the latter for oscillatory movement and automatically presented in projecting relation to the work, and a mouth leading from the said opening to the outside, said mouth being of a width to permit the removal of a gage stop laterally of the pivot without dismembering such stop or disturbing the other stops or the support.

19. In a gage of the character set forth, the combination with a supporting pivot bar or rod, of a gage stop having a hooked portion provided with a mouth opening out at one side of the stop to detachably engage on different portions of the bar or rod and movable independently thereof so as to be automatically presented in projecting relation to the work, and means located on said bar or rod for preventing the movement of the gage stop longitudinally of the said bar or rod when engaged thereon but permitting its swinging movement.

20. In a gage of the character set forth, the combination with a pivot support, of a gage stop having portions rotatably mounted on the support and movable independently thereof so as to be automatically presented in projecting relation to the work, the pivotal connection of the gage stop with the support permitting the stop to be laterally attachable and detachable from different portions of the support without dismembering the gage stop or removing the support.

21. In a gage of the character set forth, the combination of a support carrying a pivot, a gage stop provided with means for connecting it to the pivot to allow for its attachment and detachment from the pivot by a partially rotatable movement of the stop and to be automatically presented in projecting relation to the work.

22. In a gage of the character set forth, the combination of a support having a plurality of slots, a plurality of single-piece gage stops automatically operable in the slots to present them in projecting relation to the work, and means for supporting the stops in the slots to permit such movement and also allow for the removal of any of the stops without disturbing the others or without dismembering the detached stops.

23. The combination with a support, of a plurality of gage stops, means for mounting all the stops in a similar manner but providing an independent individual mounting for each stop, said individual mounting being absolutely independent of each gage stop and permitting the removal of any one of the stops without removing the others or disturbing the mountings of the other stops or even the mounting of the stop that is removed, and the said gage stops being automatically presented in projecting relation to the work.

In testimony, that I claim the foregoing as my own, I have hereto affixed my signature in the presence of two witnesses.

JAMES MARSHALL LEAVER, Jr.

Witnesses:
JAMES M. LEAVER, Sr.,
A. M. DEVOLL.